(12) United States Patent
Jiao et al.

(10) Patent No.: US 10,936,556 B2
(45) Date of Patent: *Mar. 2, 2021

(54) GENERATING A SCHEMA OF A NOT-ONLY-STRUCTURED-QUERY-LANGUAGE DATABASE

(71) Applicant: International Business Machines Corporation, Armonk, NY (US)

(72) Inventors: Limei Jiao, Beijing (CN); Chen Wang, Beijing (CN); Lanjun Wang, Beijing (CN); Shuo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 15/976,903

(22) Filed: May 11, 2018

(65) Prior Publication Data

US 2018/0260420 A1 Sep. 13, 2018

Related U.S. Application Data

(63) Continuation of application No. 14/698,106, filed on Apr. 28, 2015, now Pat. No. 10,055,429.

(30) Foreign Application Priority Data

Apr. 30, 2014 (CN) .......................... 201410181384.1

(51) Int. Cl.
*G06F 16/21* (2019.01)
*G06F 16/27* (2019.01)
(Continued)

(52) U.S. Cl.
CPC ........ *G06F 16/211* (2019.01); *G06F 16/2246* (2019.01); *G06F 16/2379* (2019.01); *G06F 16/273* (2019.01)

(58) Field of Classification Search
CPC .. G06F 16/2379; G06F 16/273; G06F 16/211; G06F 16/2246
(Continued)

(56) References Cited

U.S. PATENT DOCUMENTS 7,251,777 B1 7/2007 Valtchev
7,257,689 B1 8/2007 Baird
(Continued)

FOREIGN PATENT DOCUMENTS

CN 102308297 A 1/2012
CN 103631912 A 3/2014
(Continued)

OTHER PUBLICATIONS

"www.marketresearchmedia.com/2010", Google Search, <https://www.google.com/search?q=www.marketresearchmedia.com/2010&ie=utf-8&oe=utf-8>.
(Continued)

*Primary Examiner* — Shahid A Alam
(74) *Attorney, Agent, or Firm* — Andrew Aubert

(57) ABSTRACT

Generation of a schema of a NoSQL type database, where a set of entry(ies) of a NoSQL type database can be determined, and the record schema is a treelike relationship between key hierarchies with a key as a node in the entry, wherein the key corresponds to an attribute name. For at least one record schema, a node in which there is an attribute name variation is determined based on a similarity of sub-nodes in the treelike relationship, and the record schema is updated according to the determined result. The schema of the NoSQL type database is generated based on the updated record schema.

14 Claims, 10 Drawing Sheets

200

S201 Determining a record schema in at least one entry of the NoSQL, the record schema being a treelike relationship between key hierarchies with a key as a node in the entry S202 Determining a node in which there is an attribute name variation based on a similarity of sub-nodes, and updating a corresponding record schema according to the determined result S203 Generating the schema of the NoSQL based on the updated record schema

300

S301 Extracting keys comprised in each entry in the NoSQL

S302 Determining hierarchy information of the extracted keys in each entry

S303 Determining the treelike relationship between the keys according to the hierarchy information

(51) Int. Cl.
   *G06F 16/22*   (2019.01)
   *G06F 16/23*   (2019.01)
(58) Field of Classification Search
   USPC .......................................................... 707/803
   See application file for complete search history.

(56) References Cited

U.S. PATENT DOCUMENTS

| | | |
|---|---|---|
| 7,487,168 B2 | 2/2009 | Rys |
| 8,086,959 B2 | 12/2011 | Rothschiller |
| 8,589,450 B2 | 11/2013 | Xue |
| 8,732,213 B2 | 5/2014 | Binkert |
| 9,135,647 B2 | 9/2015 | Witten |
| 9,378,263 B2 | 6/2016 | Khimich |
| 9,436,710 B2 | 9/2016 | Shoolman |
| 2002/0147850 A1 | 10/2002 | Richards |
| 2003/0033317 A1 | 2/2003 | Ziglin |
| 2003/0208493 A1 | 11/2003 | Hall |
| 2007/0271309 A1 | 11/2007 | Witriol |
| 2008/0294899 A1 | 11/2008 | Gazzetta |
| 2008/0320054 A1 | 12/2008 | Howard |
| 2010/0049710 A1 | 2/2010 | Young, Jr. |
| 2012/0246175 A1 | 9/2012 | Duan |
| 2012/0310878 A1 | 12/2012 | Vuksan |
| 2013/0024484 A1 | 1/2013 | Banerjee |
| 2013/0086104 A1 | 4/2013 | Morrison |
| 2013/0166568 A1 | 6/2013 | Binkert |
| 2014/0095549 A1 | 4/2014 | Shi |
| 2014/0149400 A1 | 5/2014 | Fu |
| 2014/0172833 A1 | 6/2014 | Taylor |
| 2014/0214897 A1 | 7/2014 | Zhu |
| 2014/0279837 A1* | 9/2014 | Guo .................. G06F 16/282 707/603 |
| 2015/0066995 A1 | 3/2015 | Kwon |
| 2015/0154259 A1 | 6/2015 | Keeton |
| 2015/0317335 A1 | 11/2015 | Jiao |

FOREIGN PATENT DOCUMENTS

| | | |
|---|---|---|
| CN | 103714086 A | 4/2014 |
| CN | 105095237 A | 11/2015 |
| FR | 2820228 A1 | 8/2002 |
| WO | PCT-2013097802 A1 | 7/2013 |

OTHER PUBLICATIONS

Adelberg, Brad, "NoDoSE—A tool for Semi-Automatically Extracting Structured and Semistructured Data from Text Documents", pp. 1-25, provided in search report dated Mar. 5, 2012.

Baohua, Qiang, "Research on Heterogeneous Database Semantic Integration Technology", English Abstract, Chinese Doctoral Dissertations & Master's Theses Full-text Database(Doctor) information Science and Technology, ISSN:1671-6779, vol. 2015, 8, Dec. 15, 2015, pp. 14-16, China.

Duan et al., "Instance-Based Matching of Large Ontologies Using Locality-Sensitive Hashing", P. Cudre-Mauroux et al. (Eds.): ISWC 2012, Part I, LNCS 7649, pp. 49-64, 2012, © Springer-Verlag Berlin Heidelberg 2012.

Kapsammer et al., "User Profile Integration Made Easy—Model-Driven Extraction and Transformation of Social Network Schemas", WWW 2012—MultiAPro'12 Workshop, Apr. 16-20, 2012, Lyon, France, pp. 939-948.

Rahm et al., "A survey of approaches to automatic schema matching", The VLDB Journal 10: 334-350 (2001) / DOI: 10.1007/s007780100057.

Wu et al., "A Prime Number Labeling Scheme for Dynamic Ordered XML Trees", Proceedings of the 20th International Conference on Data Engineering (ICDE'04), © 2004 IEEE, 13 pages.

Yunpeng et al., "Nosql Database Logical Modeling Based on Document Model", English Abstract, China CIO News, ISSN: 1001-2362, vol. 2013, 3, Mar. 20, 2015, pp. 58-59, China.

List of IBM Patents or Patent Applications Treated as Related, Filed May 11, 2018, 2 pages.

* cited by examiner

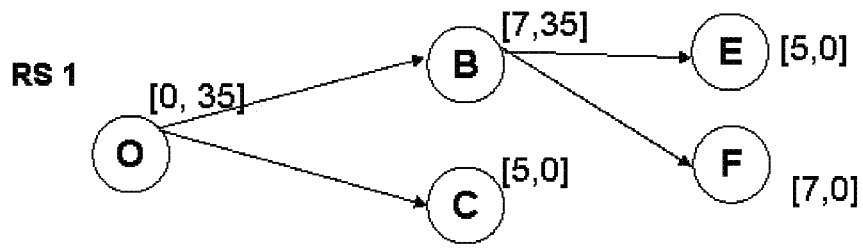
Fig. 4A
400a
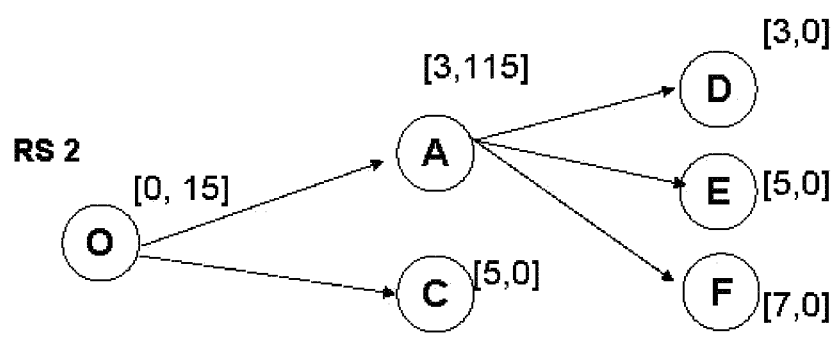
Fig. 4B
400b
```
3: D
5: E
7: F
```
Fig. 4C
400c
```
3: A
5: C
7: B
```
Fig. 4D
400d 400e
5,0,7,35,0,35
7,0,7,35,0,35
5,0,0,35

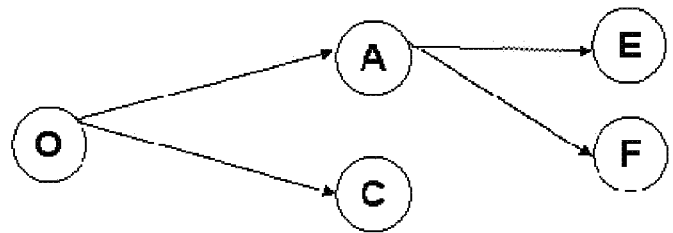
400i
Fig. 4I
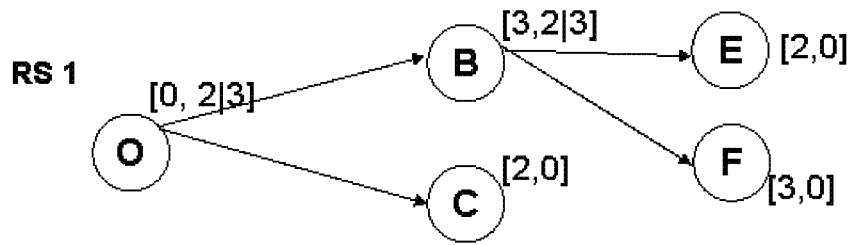
500a
Fig. 5A
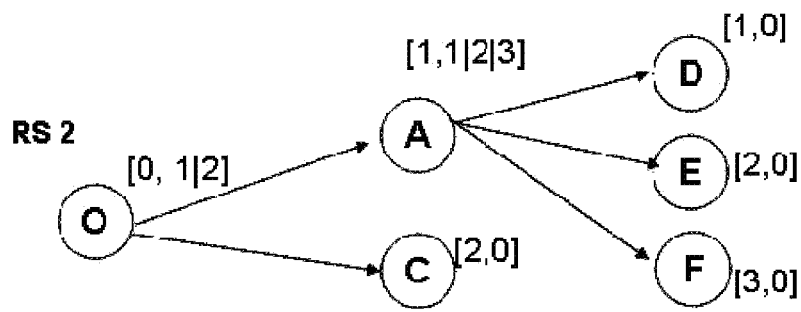
500b
Fig. 5B
500c
1: D
2: E
3: F
Fig. 5C

| |
|---|
| {author: 'don', created: new Date('03/27/2009'), Title: 'yet another blog post', Text: 'Here is the text...', tags:['example', 'don'], comments: [{author: 'mary', comment: 'I disagree'}, {author: 'alice', comment: 'good post'}]} |
| ... |
| {author: 'joe', created: new Date('03/28/2009'), Title: 'yet another blog post', Text: 'Here is the text...', tags:['example', 'joe'], mood:'happy', comments: [{author: 'jim', comment: 'I disagree'}, {author: 'nancy', comment: 'good post'}]} |
| ... |
| {author:{name: 'jason', department:' IT', age: 33, sex: 'male'}, created: new Date('10/23/2011'), Title: 'yet another blog post', Text: 'Here is the text...', tags:['example', 'jason'], comments: [{author:{ name:'mandy', department:'Sales', age: 30, sex:'female'}, comment: 'I disagree'}, {author: {name:'laura', department:'Marketing', sex: 'female' }, comment: 'good post'}]} |
| ... |

Fig. 6

GENERATING A SCHEMA OF A NOT-ONLY-STRUCTURED-QUERY-LANGUAGE DATABASE

BACKGROUND

The present invention relates to the database field, and more particularly, to a method and device for generating a schema of a NoSQL ("Not-only-Structured-Query-Language") database. A NoSQL database provides a mechanism for storage and retrieval of data that is modeled in means other than the tabular relations used in relational databases. Typical motivations for this approach include simplicity of design, horizontal scaling, and finer control over availability.

Some NoSQL databases have features of self-organizing, self-managing, low cost, high scalability, high concurrency, simply query relation, and so on. To compare a NoSQL database to a relational database, a form in the relational database usually stores a formatted data structure, and components of all entry fields are the same. Even if not every entry needs all fields, the relational database will allocate all fields to each entry. Such structure can potentially cause a performance bottleneck in a relational database. On the other hand, a NoSQL database typically carries out storage with a Key/Value pair, and its structure is not fixed. Each entry can have different fields, and each entry can add some key value pairs of its own according to a requirement so as not to be limited to the fixed structure and to thereby reduce some time and space overheads.

SUMMARY

According to an aspect of the present invention, there is a method, computer program product and/or system that performs the following operations (not necessarily in the following order): (i) determining a record schema of a set of entry(ies) in a Not-only-Structured-Query-Language (NoSQL) type database, the record schema being a treelike relationship between key hierarchies with a key as a node in each entry of the set of entry(ies), wherein the key corresponds to an attribute name; (ii) determining a node in which there is an attribute name variation based on a similarity of sub-nodes in the treelike relationship, and updating a corresponding record schema according to the determined result; and (iii) generating a schema for the NoSQL type database based on the updated record schema.

BRIEF DESCRIPTION OF THE DRAWINGS

Through the more detailed description of the embodiments of the present disclosure in connection with the accompanying drawings, the above and other objects, features and advantages of the present disclosure will become more apparent, wherein the same reference numerals generally refer to the same components in the embodiments of the present disclosure which are shown in the following Figures:

FIGS. 4A to 4I show a series of diagram helpful in understanding a method for generating a schema for a NoSQL type database according to one embodiment of the present invention;

FIGS. 5A to 5I show a series of diagram helpful in understanding another method for generating a schema for a NoSQL type database according to another embodiment of the present invention;

FIG. 6 shows a schematic diagram of a part of contents in a NoSQL according to an embodiment of the present invention;

DETAILED DESCRIPTION

Figure 1:
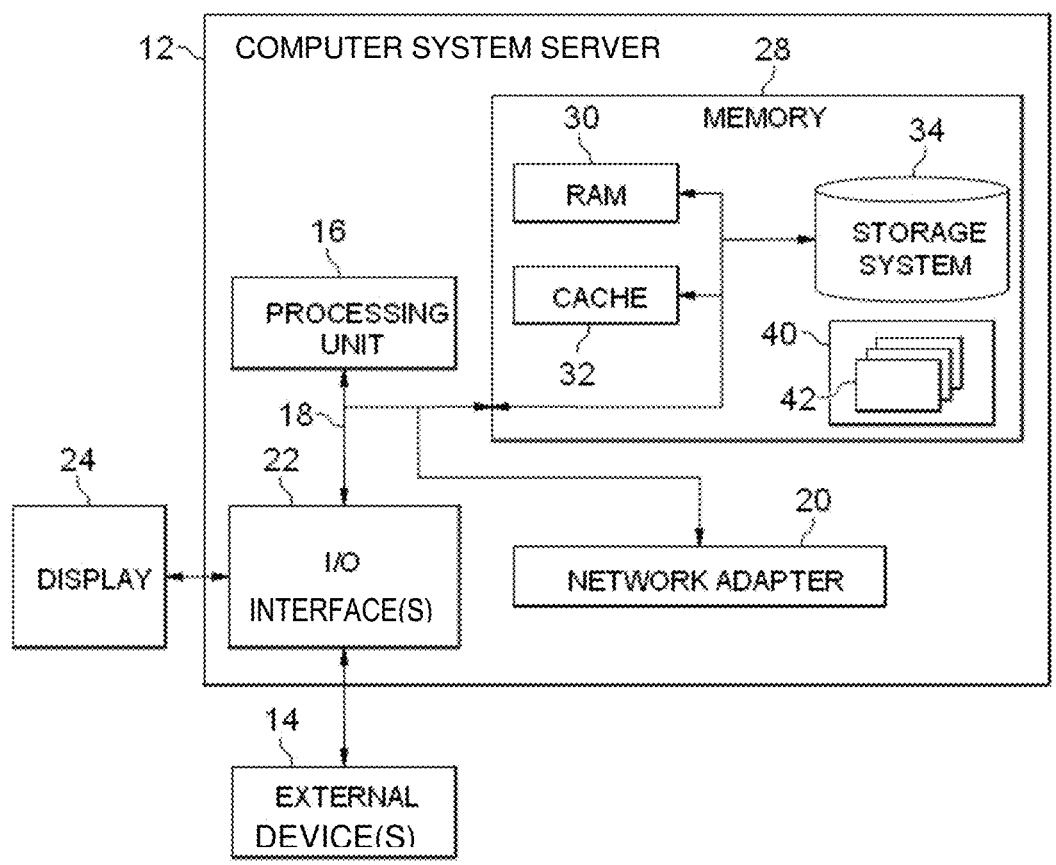
FIG. 1 shows a block diagram of a computer system/server which is applicable to implement an embodiment of the present invention.

Currently, because NoSQL has no schema comparable to the types of schema conventionally generated and used in conjunction with a relational database, processes, such as data matching, data consolidating, data exchanging and etc., between the relational database and the NoSQL cannot be performed according to the schema. This makes it difficult to achieve a consolidation of both the relational database and the NoSQL. Some embodiments of the present disclosure generate a schema for a NoSQL (also sometimes herein referred to as a "NoSQL type database"). Particularly, because it is not necessary to establish a field for the data to be stored in advance, and a self-defined data format can be stored at any time, in the case of a change in the website architecture, a programmer change, a modification made by a programmer or the like, an attribute name of newly added data can be varied at any time, which results in a difficulty in generating the schema of the NoSQL, which can be effectively handled by some embodiments of the present disclosure.

Some embodiments of the present disclosure provide a solution of acquiring a schema in a NoSQL. More specifically, embodiments of the present invention provide a method and device for generating a schema of a NoSQL type database.

According to an aspect of the present invention, a method for generating a schema of a NoSQL is provided. The method can include the following operations (not necessarily in the following order): (i) determining a record schema of at least one entry in the NoSQL, the record schema being a treelike relationship between key hierarchies with a key as a node in the entry, wherein the key corresponds to an attribute name; (ii) determining a node in which there is an attribute name variation based on a similarity of sub-nodes in the treelike relationship, and updating a corresponding record schema according to the determined result; and (iii) generating the schema of the NoSQL based on the updated record schema.

According to another aspect of the present invention, a device for generating a schema of a NoSQL is provided. The device can include: (i) a determiner configured to determine a record schema of at least one entry in the NoSQL, the record schema being a treelike relationship between key hierarchies with a key as a node in the entry, wherein the key corresponds to an attribute name; (ii) an attribute name variation determiner configured to determine a node in which there is an attribute name variation based on a similarity of sub-nodes in the treelike relationship, and updating a corresponding record schema according to the determined result; and (iii) a generator configured to generate the schema of the NoSQL based on the updated record schema.

It will be understood from the description below that the schema of the NoSQL can be generated conveniently and promptly with the embodiments of the present invention.

Hereafter, the preferred embodiments of the present disclosure will be described in more detail with reference to the companying drawings. Although the companying drawings show the preferred embodiments of the present disclosure, it should be understood that the present disclosure can be implemented in various forms and should not be limited to the embodiments set forth herein. On the contrary, these embodiments are provided for the thorough and complete understanding of the present disclosure, and completely conveying the scope of the present disclosure to those skilled in the art.

FIG. 1 shows a block diagram of an exemplary computer system 10 (including computer system server 12) which is applicable to implement an embodiment of the present invention. The computer system 10 shown in FIG. 1 is only an example, and should not limit the scope of use or functionality of embodiments of the present invention.

As shown in FIG. 1, the computer system 10 is shown in the form of a general-purpose computing device. The components of computer system 10 and/or server 12 may include, but are not limited to, one or more processors or processing units 16, a system memory 28, and a bus 18 that couples various system components including the system memory 28 and the processing unit 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The server 12 typically includes a variety of computer system readable media. These media may be any available media that is accessible by server 12, and it includes both volatile and non-volatile media, removable and non-removable media.

System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each driver can be connected to bus 18 by one or more data media interfaces. The memory 28 may include at least one program product having a set (for example, at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Server 12 may also communicate with one or more external devices 14 such as a keyboard, a pointing device, display 24, etc.; one or more devices that enable a user to interact with the computer system/server 12; and/or any devices (for example, network card, modem, etc.) that enable the computer system/server 12 to communicate with one or more other computing devices. Such communication can occur via Input/Output (I/O) interfaces 22. Still yet, server 12 can communicate with one or more networks such as a local area network (LAN), a general wide area network (WAN), and/or a public network (for example, the Internet) via network adapter 20. As depicted, the network adapter 20 communicates with the other module of server 12 via bus 18. It should be understood that although not shown, other hardware and/or software modules could be used in conjunction with server 12. Examples, include, but are not limited to: microcode, device drivers, redundant processing units, external disk drive arrays, RAID systems, tape drives, and data archival storage systems, etc.

In an embodiment of the present invention, an "entry" can be a record in a NoSQL, and can also be regarded as a data object instance in the NoSQL. One entry can possess a unique identifier (ID), and can comprise zero or more Key/Value pairs. According to the embodiment of the present invention, a pre-defined specificator can be used to distinguish between individual Key/Value pairs. For example, different Key/Value pairs are distinguished by a comma. Meanwhile, the "key" and the "value" within each Key/Value pair can be separated by a pre-defined delimiter, for example, a colon, thus the key in a Key/Value pair can be determined from the Key/Value pair according to the delimiter. At the same time, the "value" in a Key/Value pair can be extended by a pre-defined extension symbol, for example, square brackets which can be used to represent that the "value" in a Key/Value pair comprises more than two attributes. Each attribute in the more than two attributes can either be a real "value", or be a Key/Value pair in which the "value" can continue to comprise one or more attribute.

FIG. 6 shows a schematic diagram 600 (also sometimes herein referred to as the "exemplified NoSQL") of a part of contents in a NoSQL 600 according to an embodiment of the present invention. As shown in FIG. 6, exemplified NoSQL 600 includes a plurality of records each representing an entry. The NoSQL per se can have an identifier so as to represent itself and distinguish itself from the other NoSQLs. For example, the identifier of the NoSQL 600 can be "Blog". According to an embodiment of the present invention, the identifier of the NoSQL can be considered as a key. Therefore, when constructing hierarchy information of keys, it can be considered as a key in the hierarchy information. Now returning to FIG. 6, in the entry corresponding to the first record, "author: 'don'" is a Key/Value pair, wherein the key is "author", the value is "don". Further, "comments: [{author: 'mary', comment: 'I disagree'}, {author: 'alice', comment: 'good post'}]" in the entry is also a Key/Value pair, wherein the key is "comments", and the value is "[{author: 'mary', comment: 'I disagree'}, {author: 'alice', comment: 'good post'}]". It can be seen that one or more Key/Value pairs can be nested in the value. According to the specificator, the delimiter, the extension symbol and the like, the hierarchy information between keys can be determined, so that the associating relationship between keys is determined, and the treelike relationship between keys in each entry can be further determined.

Figure 2:
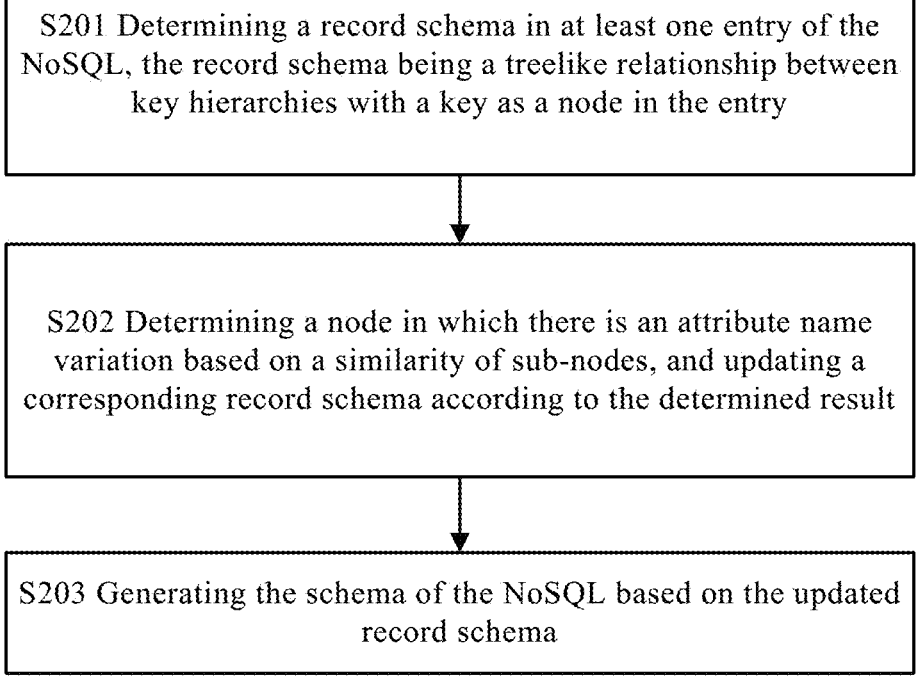
FIG. 2 shows a schematic flowchart of a method for generating a schema of a NoSQL according to one embodiment of the present invention.

FIG. 2 shows a schematic flowchart of a method 200 for generating a schema of a NoSQL according to one exemplary embodiment of the present invention.

In step S201, a record schema in at least one entry of the NoSQL is determined, and the record schema is a treelike relationship between key hierarchies with a key as a node in the entry, wherein the key corresponds to an attribute name.

How to parse the treelike relationship from a record entry is the prior art technology. Specifically, in one embodiment according to the present invention, keys comprised in one entry in the NoSQL can be extracted, hierarchy information of the extracted keys in each entry is determined, and the associating relationship between the keys is determined according to the hierarchy information, further the treelike relationship between the keys is determined.

Figure 3:
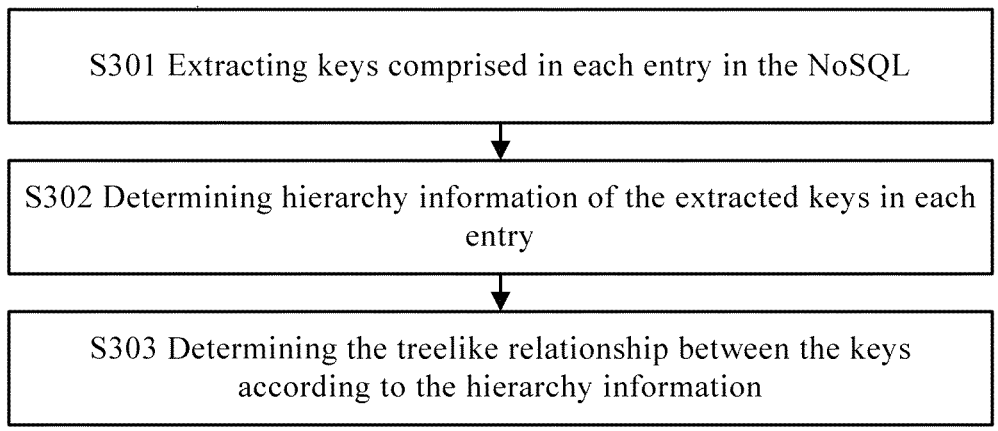
FIG. 3 shows a schematic flowchart of a method for determining a record schema in at least one entry of a NoSQL according to one embodiment of the present invention.

Next, as exemplified in method 300 of FIG. 3, how to determine the treelike relationship between the keys in the entry is explained in detail. FIG. 3 shows a schematic flowchart of the method 300 for generating a treelike relationship of a data entry in a NoSQL according to one exemplary embodiment of the present invention.

In step S301, keys comprised in each entry in the NoSQL are extracted.

According to the embodiment of the present invention, firstly, which Key/Value pairs are comprised in each entry can be determined, then keys therein are extracted from the determined Key/Value pairs, and thus the process of extracting keys in each entry in this entry set is finished.

In the exemplary NoSQL shown in FIG. 6, different Key/Value pairs are distinguished by commas, and the "key" and the "value" in each Key/Value pair are separated by a colon. Therefore, the following keys comprised in the first entry of the NoSQL can be extracted therefrom: author, created, Title, Text, tags, comments, and comment. Similarly, the keys comprised in the second, third . . . Nth entries of the NoSQL can be extracted respectively.

In step S302, the hierarchy information of the extracted keys in each entry is determined.

According to the embodiment of the present invention, the hierarchy relationship between the keys can be determined according to the pre-defined various symbols (the specificator, the delimiter, the extension symbol and so on). In the exemplary NoSQL shown in FIG. 6, a comma is used as the specificator exemplarily, a colon is used as the delimiter exemplarily, and a square bracket is used as the extension symbol. Thus, the hierarchy information of the keys in one entry can be determined according to the presence of these symbols.

In step S303, the treelike relationship between the keys is determined according to the hierarchy information.

Figure 7:
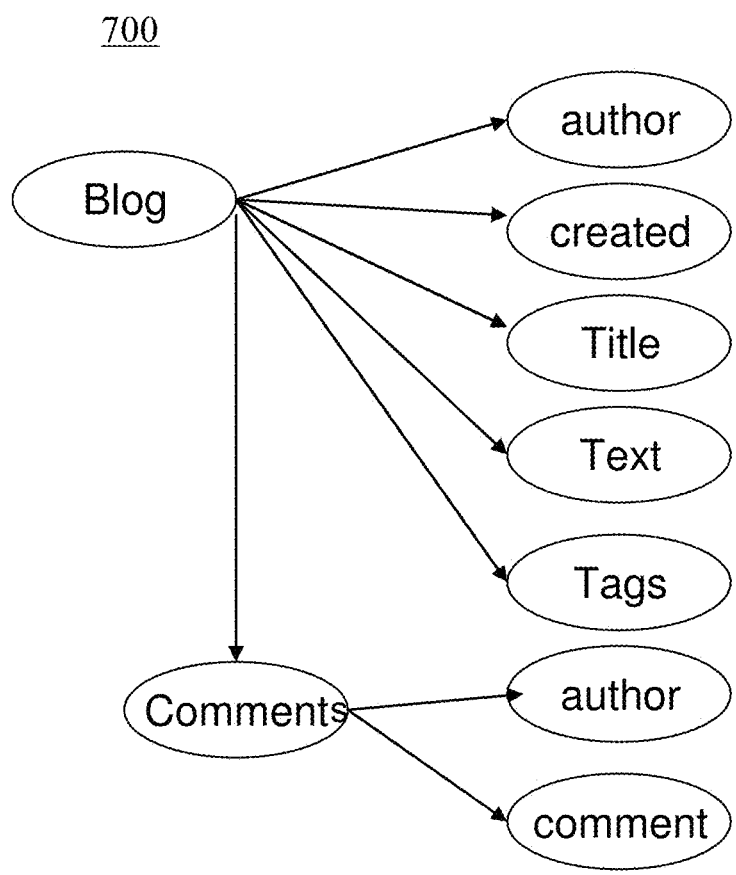
FIG. 7 shows a schematic diagram of a tree-like relationship according to an embodiment of the present invention.

In the schematic diagram 700 of the hierarchy information shown in FIG. 7, the hierarchy information between the keys such as author, created, Title, Text, tags, comments, comment, etc., for example, extracted from Step 301, is shown in a tree structure. Assumed that Blog is a root node, those keys of author, created, Title, Text, tags, comments are first level sub-nodes of the root node, in which the first level sub-node comments further has two sub-nodes, that is, the two keys of author and comment, which are second level sub-nodes of the root node simultaneously.

According to the embodiment of the present invention, the first level sub-node is the sub-node which is associated with the root node directly; the second level sub-node is the sub-node which is associated with the first level sub-node directly; and on the analogy of this, the Nth level sub-node is the sub-node which is associated with the N−1th level sub-node directly. For example, in the first entry, those keys of author, created, Title, Text, tags, and comments are associated with the NoSQL directly, so they are all the first sub-node, respectively. Since the value corresponding to the key of comments includes {author: 'mary', comment: 'I disagree'} and {author: Vice', comment: 'good post'}, the two keys of author and comment comprised in the value are directly associated with the key of comments, respectively, and are not directly associated with the root node, thus the keys of author and comment are the second level sub-nodes.

It can be seen from the above that the associating relationship between the sub-nodes can be determined according to the hierarchy information obtained in step S302, so that the treelike relationship between the keys can be determined correspondingly.

Next, returning to step S202 in FIG. 2, in step S202, based on a similarity of sub-nodes, a node in which there is an attribute name variation is determined, and a corresponding record schema is updated according to the determined result.

In one embodiment, based on the encoded tree structured record schema the node of which the name varies is determined. Specifically, the embodiment includes the following steps: CinP-encoding the record schema of the each entry, The CinP-encoding being an encoding, when each node in the record schema is encoded, including not only the encoding of the node itself but also the encoding of the sub-nodes thereof; the determining the node in which there is an attribute name variation based on the similarity of the sub-nodes is determining the node in which there is an attribute name variation based on the similarity of the sub-nodes in the encoded record schema.

In one embodiment, a prime number can be used to CinP-encode each entry. In another embodiment, a natural number-character string can also be used to CinP-encode each entry. The applicant will introduce the two embodiments in more detail in the embodiments shown in FIGS. 4A to I (respectively showing diagrams 400a to 400i) and 5A to 5I (respectively showing diagrams 500a to 500i).

FIGS. 4A to 4I show various schematic diagrams helpful in understanding a scheme generation process ("SGP") of generating a schema of a NoSQL based on a record schema which is encoded with a prime number according to one exemplary embodiment of the present invention. The SGP will be discussed in the following paragraphs with extensive reference do diagrams 400a to 400h of FIGS. 4A to 4H.

SGP, FIRST STEP: the record schema of the every entry is CinP-encoded, and the CinP-encoding is a encoding including not only the encoding of the node itself but also the encoding of the sub-nodes thereof when each node in the record schema is encoded. By this step, a hierarchical CinP-encoding is constructed for the record schema of each record.

In one embodiment, the encoding is carried out starting from the lowest tier node of the tree structure to the root node. Each tier maintains one code map for representing a corresponding relationship between an attribute name and a code. FIGS. 4C and 4D show a code map based on a prime number code, respectively, in which FIG. 4C is the code map corresponding to the lowest tier, and FIG. 4D is the code map corresponding to the second tier from the lowest tier. The code of each node includes two parts: a self-code part (P-code) representing the encoding of the node itself, and a sub-node code part (C-code) representing the encoding of the sub-nodes of the node, both of which are prime numbers. In one embodiment, C-code is a product of P-codes of all sub-nodes of a node. FIGS. 4A and 4B show the results after a record schema 1 and a record schema 2 are encoded with the prime number, respectively, for example, in which the code of the node B in the record schema 1 is 7, 35, where 7 is the self-code of the node B, and 35 is the sub-node code of the node B, which is the product of the self-codes of the sub-nodes E and F of the node B.

SGP, SECOND STEP: the encoded tree structured record schema is parsed as a path set, and the paths include the codes of all nodes which are traversed from leaf nodes to a root node. FIGS. 4E and 4F show the path sets for the two record schemas, respectively. For example, one path in the record schema 2 is D,A,O, indicated as 3,0,3,115,0,15 with a CinP-code. In the code, the odd number digit is the P-Code, the even number digit is the C-Code, and the last two codes represent the P-Code and the C-Code of the root node. Since the leaf node has no sub-node, the C-Code of the leaf node is 0. Meanwhile, since the root node is a virtual node, the P-Code is 0.

SGP, THIRD STEP: frequencies of the paths in the path sets of all entries are counted statistically. FIG. 4G shows the result of path frequency statistics, in which the record schema 1 occurs once, and the record schema 2 occurs twice. In FIG. 4G, a number in "( )" represents the frequency of the path.

SGP, FOURTH, FIFTH AND SIXTH STEPS: are performed iteratively from the bottom tier node to the root node, as will be discussed in the following paragraphs.

SGP, FOURTH STEP: the paths are bucketed according to the P-Code of the tier, and the same P-codes are allocated to the same bucket. In the for the path set, taking the lowest tier as an example, all paths are respectively 3, 5, 7 and without the lowest tier node according to the P-Code, allocated to 4 buckets, as follows:

Bucket 1: 3,0,3,115,0,15 (2)
Bucket 2: 5,0,3,115,0,15 (2)
    5,0,7,35,0,35 (1)
Bucket 3: 7,0,3,115,0,15 (2)
    7,0,7,35,0,35 (1)
Bucket 4: 5,0,0,15 (2)
    5,0,0,35 (1)

SGP, FIFTH STEP: in the buckets, the step of judging whether an attribute name variation occurs includes:
1) checking whether there are more than one paths in one bucket;
2) if yes, checking whether the P-Codes of their parent nodes are different;
3) if they are different, calculating the similarity of the parent nodes with the C-Codes of their parent nodes and according to equation (1) as follows:

$$S(N_1, N_2) = \frac{|C_{N_1} \cap C_{N_2}|}{|C_{N_1} \cup C_{N_2}|} \quad (1)$$

where N1 and N2 represent two parent nodes, $C_{N_1}$ represents a set of sub-nodes of N1, $C_{N_2}$ represents a set of sub-nodes of N2, and |"set"| represents a number of elements in the "set" defined between the start and end notations. The similarity defines a ratio of a number of common sub-nodes contained in the two parent nodes and a total number of the sub-nodes. That is to say, when the sub-nodes included in the two parent nodes are totally the same, the similarity is 1; and when all sub-nodes of the two parent nodes are different, the similarity is 0. In the above example, as for nodes A and B, they contain two common sub-nodes (E, F), the number of all sub-nodes is three (D, E, F), and thus the similarity is ⅔.

When the above encoding with the prime number is carried out, the number of the common sub-node of the two parent nodes is a number of prime numbers included in the greatest common divisor of the C-Codes of the two parent nodes; and the number of total sub-nodes of the two parent nodes is a number of prime numbers included in the least common multiple of the C-Codes of the two parent nodes. Thus it can be seen that the efficiency in determining the similarity can be significantly improved by encoding with the prime number. In this example, the C-Code corresponding to the P-Code of the parent node is 3 is 115; and the C-Code corresponding to the P-Code of the parent node is 7 is 35. The greatest common divisor of 115 and 35 is 35, which can be decomposed into two prime numbers. The least common multiple of 115 and 35 is 115, which can be decomposed into three prime numbers.

4) if the similarity is greater than a threshold value G1, considering that the attribute name variation occurs in the two parent nodes.

5) creating a code map pair according to a certain rule: source P-Code->target P-Code, according to the code map of the corresponding tier, the code map pair can be parsed as a map pair: source attribute name->target attribute name. In the subsequent processing, the source attribute name will be replaced with the target attribute name. For example, when the rule is to retain the attribute name which occurs at a higher frequency, the source attribute name is the attribute name with a lower occurring frequency, and the target attribute name is the attribute name with a higher occurring frequency. In this example, since the record schema 2 occurs in the data twice, occurring more than the record schema 1, the code map pair is 7->3, the source attribute name is B, and the target attribute name is A. The rule herein can also be set as retaining the attribute name occurring most recently or retaining the attribute name having semantics, and so on.

SGP, SIXTH STEP: according to the code map pair, updating the source P-Code in the parent node tier to the target P-Code, and updating the C-Code code of the corresponding parent node of this node. In this example, except that all P-Codes in the parent node tier are revised from 7 to 3, the C-Code of the parent node of this node also need to be revised from 35(7*5) to 15(3*5). In FIG. 4H, the gray numbers help show the updated path set.

SGP, SEVENTH STEP: in the path code, only extracting the sub-sequence comprising the P-Code, and counting the frequency at which this sub-sequence occurs statistically (that is, merging the same P-Code sub-sequence). For example, the P-Code sub-sequence of the path 5,0,3,115,0, 15 having a frequency of 2 is 5,3,0, and the P-Code sub-sequence of the path 5,0,3,35,0,15 having a frequency of 1 is 5,3,0, both of which are the same. After merging, the P-Code sub-sequence 5,3,0 has a frequency of 3.

SGP, EIGHTH STEP: retaining the P-Code sub-sequence having a frequency of more than the threshold value G2, and decoding the P-Code sub-sequence according to the code maps of the tiers to generate a schema of table. In this example, assuming that G2=100%, the schema shown in diagram 400i of FIG. 4I is obtained.

FIGS. 5A to 5I respectively show schematic diagrams 500a to 500i, which help show a process of generating a schema of a NoSQL (herein sometimes referred to as "SGP2") based on a record schema encoded with a nature number-character string according to one exemplary embodiment of the present invention.

SGP2, FIRST STEP: the record schema of the each entry is CinP-encoded, and the CinP-encoding is a encoding including not only the encoding of the node itself but also the encoding of the sub-nodes thereof when each node in the record schema is encoded. By this step, a hierarchical CinP-encoding is constructed for the record schema of each record.

In one embodiment, the encoding is carried out starting from the lowest tier node of the tree structure to the root node. Each tier maintains one code map for representing a corresponding relationship between an attribute name and a code. FIGS. 5C and 5D show a code map based on a nature number code, respectively, in which FIG. 5C is the code map corresponding to the lowest tier, and FIG. 5D is the code map corresponding to the second tier from the lowest tier. The code of each node includes two parts: a self-code part (P-code) representing the encoding of the node itself, and a sub-node code part (C-code) representing the encoding of the sub-nodes of the node. In the embodiment that the encoding is carried out with the nature number-character string, for example, the code of a node B in the record schema 1 is 3, 2|3, in which 3 is the self-code of the node B, and 213 is the sub-node code of the node B, which is the combination of the self-codes of sub-nodes E and F of the node B and the globally defined delimiter "|".

SGP2, SECOND STEP: the encoded tree structured record schema is parsed as a path set, and the paths include the codes of all nodes which are traversed from leaf nodes to a root node. FIGS. 5E and 5F show the path sets for the two record schemas, respectively. For example, one path in the record schema 2 is D,A,O, indicated as 1,0,1,1|2|3,0,1|2 with a CinP-code. In the code, the odd number bit is the P-Code, the even number bit is the C-Code, and the last two codes represent the P-Code and the C-Code of the root node. Since the leaf node has no sub-node, the C-Code of the leaf node is 0. Meanwhile, since the root node is a virtual node, the P-Code is 0.

SGP2, THIRD STEP: frequencies of the paths in the path sets of all entries are counted statistically. FIG. 5G shows the result of path frequency statistics, in which the record schema 1 occurs once, and the record schema 2 occurs twice. In FIG. 5G, a number in "( )" represents the frequency of the path.

Next, SGP2 FOURTH, FIFTH and SIXTH steps are performed iteratively from the bottom tier node to the root node, as will be further discussed in the following paragraphs.

SGP2, FIFTH STEP: the paths are bucketed according to the P-Code of the tier, and the same P-codes are allocated to the same bucket. In the for the path set, taking the lowest tier as an example, all paths are respectively 1, 2, 3 and without the lowest tier node according to the P-Code, allocated to 4 buckets, that is
Bucket 1: 1,0,1,1|2|3,0,1|2 (2)
Bucket 2: 2,0,1,1|2|3,0,1|2 (2)
    2,0,3,2|3,0,2|3 (1)
Bucket 3: 3,0,1,1|2|3,0,1|2 (2)
    3,0,3,2|3,0,2|3 (1)
Bucket 4: 2,0,0,1|2 (2)
    2,0,0,2|3 (1)

SGP2, FIFTH STEP: in the buckets, the step of judging whether an attribute name variation occurs includes:
1) checking whether there are more than one paths in one bucket, in this embodiment, Bucket 2 has more than one paths.
2) if yes, checking whether the P-Codes of their parent nodes are different, in this embodiment, the P-Codes of the parent nodes of the same nodes correspond to Bucket 2 are different, and are 1 and 2, respectively;
3) if they are different, calculating the similarity of the parent nodes with the C-Codes of their parent nodes and according to equation (1) (set forth, above). When encoding with the nature number-character is used, all sub-nodes of one node can be obtained by parsing its C-Code in conjunction with the delimiter "|". For example, in this example, the C-Code corresponding to the parent node P-Code is 1 is 1|2|3, and it can be obtained by parsing that three sub-nodes, of which the P-Codes are 1, 2, 3, respectively, are included therein. Similarly, the C-Code corresponding to the parent node P-Code is 3 is 2|3, and it can be obtained by parsing that two sub-nodes, of which the P-Codes are 2, 3, are included therein.
4) if the similarity is greater than a threshold value G1, considering that the attribute name variation occurs in the two parent nodes.
5) creating a code map pair according to a certain rule: source P-Code->target P-Code, according to the code map of the corresponding tier, the code map pair can be parsed as a map pair: source attribute name->target attribute name. In the subsequent processing, the source attribute name will be replaced with the target attribute name. For example, when the rule is to retain the attribute name which occurs at a higher frequency, the source attribute name is the attribute name with a lower occurring frequency, and the target attribute name is the attribute name with a higher occurring frequency. In this example, since the record schema 2 occurs in the data twice, occurring more than the record schema 1, the code map pair is 7->3, the source attribute name is B, and the target attribute name is A. The rule herein can also be set as retaining the attribute name occurring most recently or retaining the attribute name having semantics, and so on.

Figures 5H, 5I:
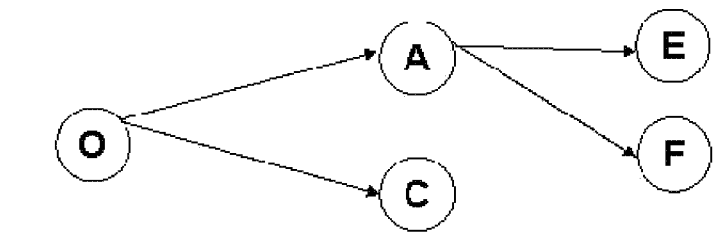

SGP2, SIXTH STEP: according to the code map pair, updating the source P-Code in the parent node tier to the target P-Code, and updating the C-Code code of the corresponding parent node of this node. In this example, except that all P-Codes in the parent node tier are revised from 3 to 1, the C-Code of the parent node of this node also need to be revised from 2|3 to 2|1. FIG. 5H shows the updated path set.

SGP2, SEVENTH STEP: in the path code, only extracting the sub-sequence comprising the P-Code, and counting the frequency at which this sub-sequence occurs statistically (that is, merging the same P-Code sub-sequence). For example, the P-Code sub-sequence of the path 2,0,0,1|2 having a frequency of 2 is 2,0, and the P-Code sub-sequence of the path 2,0,0,2|3 having a frequency of 1 is 2,0, both of which are the same. After merging, the P-Code sub-sequence 2,0 has a frequency of 3.

SSP2, EIGHTH STEP: retaining the P-Code sub-sequence having a frequency of more than the threshold value G2, and decoding the P-Code sub-sequence according to the code maps of the tiers to generate a schema of table. In this example, assuming that G2=100%, the schema shown in FIG. 5I is obtained.

Next, explanation on other embodiments of step S202 in FIG. 2 will follow. In one embodiment, based on a similarity of sub-nodes in the treelike relationship, the node in which there is an attribute name variation is determined, and a corresponding record schema is updated according to the determined result includes: parsing the encoded record schema in a tree structure into a path set, the path comprising codes of all nodes which are traversed from leaf nodes to a root node; (A) putting into buckets according to the P-Code of a certain tier; (B) in the buckets, determining a parent node in which there is an attribute name variation according to the similarity of the sub-nodes and (C) updating a source P-Code in the tier of part of the determined parent node in which there is an attribute name variation to a target P-Code, and updating a code of a C-Code of the parent node corresponding to the node.

In one more specific embodiment, further comprised is: the source P-Code of part of the determined parent node in which there is an attribute name variation is updated to the target P-Code according to a certain rule, in which the source P-Code is corresponding to a source attribute name, and the target P-Code is corresponding to a target attribute name. The rule can be, for example, retaining the attribute name with a high occurring frequency, wherein the source attribute name is the attribute name with a lower occurring frequency, and the target attribute name is the attribute name with a higher occurring frequency. The embodiment shown in FIG. 4 also involves other rules.

In another more specific embodiment, steps A-C are not performed only in a certain tier, but performed starting from the bottom tier node in the tree structure to the root node iteratively.

Next, explanation on other embodiments of step S203 in FIG. 2 will follow. In step S203, based on the updated record schema, the schema of the NoSQL is generated.

According to an embodiment of the present invention, the schema of the NoSQL can be generated in many ways. In one embodiment according to the present invention, an effective path in at least one path and its weight can be acquired, and then the schema of the NoSQL can be generated based on the effective path and its weight.

In one embodiment according to the present invention, the effective path and its weight can be acquired from the at least one path in a plurality of implementing modes. For example, a repeated path can be determined in the at least one path; the repeated path can be set as one effective path, and the weight of the effective path obtained in such way can be set as the repeating times of the repeated path; meanwhile, unrepeated paths can be set as one effective path, respectively, and a weight of the effective path set in such way is set as an predefined weight. According to the embodiment of the present invention, the predefined weight can be 1, for example.

According to one embodiment of the present invention, the effective path of which the weight is less than a predefined weight threshold value is filtered out so that only the effective path with a greater weight is used to generate the schema of the NoSQL. For example, the weight of each effective path is compared with the predefined weight threshold value, one or more target paths are selected from the effective paths according to the comparison result, and then the schema of the NoSQL is generated based on the selected target paths. By this implementing mode, some keys with a lower occurring frequency can be filtered out, so as to avoid that a scale of the schema generated for the NoSQL is too large.

In some embodiments of the present invention, one or more paths can be determined according to the hierarchy information of the keys, and the keys having the associating relationship are divided into the same path. For example, in FIG. 7, each path can comprise several levels of sub-nodes, starting from the root node and ending with an end leaf node, that is, the last level sub-node, and each path is not the same as another path completely. In a schematic diagram shown in FIG. 7, Blog and created form one path Blog->created; Blog, Comments and author form one path Blog->Comments->author; Blog, Comments and comment form one path Blog->Comments->comment, etc., and the others are not described in detail unnecessarily.

When the record schema with the treelike relationship is encoded with the CinP code further disclosed in an embodiment of the present application, the paths are determined according to the CinP code of the included nodes.

Figure 8:
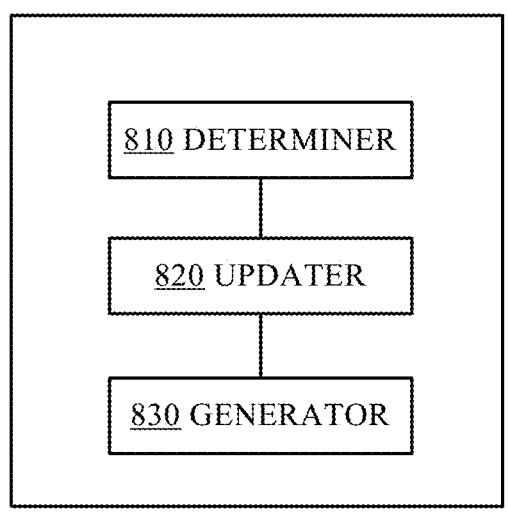
FIG. 8 shows a schematic diagram of a device for generating a schema of a NoSQL according to an embodiment of the present invention.

FIG. 8 shows a schematic block diagram of a device 800 for generating a schema of a NoSQL according to one exemplary embodiment of the present invention.

According to the embodiment of the present invention, the device 800 can include: a determiner 810, configured to determine a record schema of at least one entry in the NoSQL, the record schema being a treelike relationship between key hierarchies with a key as a node in the entry, wherein the key corresponds to an attribute name; an updater 820, configured to determine a node in which there is an attribute name variation based on a similarity of sub-nodes in the treelike relationship, and updating a corresponding record schema according to the determined result; and a generator 830, configured to generate the schema of the NoSQL based on the updated record schema.

In one embodiment, the device shown in FIG. 8 further includes: a module, configured to CinP-encode the record schema of the each entry, wherein, the CinP code of each node includes the code P-Code of the node itself and the code C-Code of the sub-nodes of the node; the attribute name variation determiner determines the node in which there is an attribute name variation based on the similarity of the sub-nodes in the CinP-encoded record schema.

In one embodiment, the attribute name variation determiner 820 includes: a module configured to parse the encoded record schema in the treelike structure as the path set, the path comprising the code of all nodes which are traversed from leaf nodes to a root node; a module configure to perform bucketing according to the P-Code of a certain tier; a module configured to, in the buckets, judge that the parent nodes the node in which there is an attribute name variation are determined according to the similarity of the sub-nodes in of the tier; and a module configure to update the source P-Code of the parent nodes as the target P-Code, and update the code of the C-Code of the parent node corresponding to the updated parent nodes.

In one embodiment, the module configured to, in the buckets, judge that the parent node whose attribute name variation is present is determined according to the similarity of the sub-nodes in of the tier includes: a module configured to determine, for the bucket in which a plurality of paths exist, a node whose parent nodes in the plurality of paths have different P-Code, a module configured to calculate the similarity of the parent nodes with the use of the C-Code of the parent nodes and the equation, in which, N1 and N2 present two parent nodes, $C_{N1}$ represents a set of sub-nodes of N1, $C_{N2}$ represents a set of sub-nodes of N2, and |.| represents the number of elements in a set; a module configured to consider that the attribute name variation occurs in the two parent nodes if the similarity is greater than a threshold value G1.

In one embodiment, the module configured to generate the schema of the NoSQL based on at least one updated record schema includes: a module configured to, in the path code, extract the sub-sequence only comprising the P-Code, count the frequency at which this sub-sequence occurs statistically, and merge the same P-Code sub-sequences; a module configured to retain the P-Code sub-sequence having a frequency of more than the threshold value of G2, and decode the P-Code sub-sequence according to the code maps of the tiers to generate the schema of the NoSQL.

In one embodiment, the determiner 810 includes: a module configured to extract the keys comprised in the entries; a module configured to determine the hierarchy information of the extracted keys in the entries; and a module configured to determine the treelike relationship between the keys according to the hierarchy information.

In one embodiment, the generator 830 includes: a module configured to acquire the effective path and its weight in the at least one path; and a module configured to generate the schema of the NoSQL based on the effective path and its weight.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following paragraphs set forth some definitions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   determining a record schema of a set of entry(ies) in a Not-only-Structured-Query-Language (NoSQL) type database, the record schema being a treelike relationship between key hierarchies with a key as a node in each entry of the set of entry(ies), wherein the key corresponds to an attribute name;
   encoding the record schema of the each entry of the set of entry(ies) with child in parent (CinP) encoding, where a CinP-code of each node includes a parent code (P-Code) of the node itself and a child code (C-Code) of the sub-nodes thereof;
   determining a node in which there is an attribute name variation based on a similarity of sub-nodes in the CinP-encoded record schema, and updating a corresponding record schema according to the determined result, further including:
   parsing the encoded record schema in the tree structure into a path set, the path including the codes of all nodes which are traversed from a leaf node to a root node,
   putting into buckets according to the P-Code of a certain tier,
   in the buckets, determining a parent node in which there is an attribute name variation according to the similarity of the sub-nodes in the tier,
   updating a source P-Code of part of the determined parent node in which there is an attribute name variation to a target P-Code, and
   updating the C-Code of a parent node corresponding to the updated parent node; and
   generating a schema for the NoSQL type database based on the updated record schema.

2. The method according to claim 1, wherein the determination of a parent node in which there is an attribute name variation includes:
   for the bucket in which a plurality of paths exist, determining a node whose parent nodes in the plurality of paths have different P-Code;
   calculating the similarity of the parent nodes by the C-Code of the determined parent nodes and an equation $$S(N_1, N_2) = \frac{|C_{N_1} \cap C_{N_2}|}{|C_{N_1} \cup C_{N_2}|},$$

where $N_1$ and $N_2$ represent two parent nodes, $C_{N_1}$ represents a set of sub-nodes of N1, $C_{N_2}$ represents a set of sub-nodes of N2, and the |"set"| represents a number of elements in the set;
   considering that an attribute name variation occurs in the two parent nodes if the similarity is greater than a threshold value G1.

3. The method according to claim 2, wherein the generation of the schema of the NoSQL type database includes:
   in the path code, extracting a sub-sequence containing only the P-Code, counting a frequency at which the sub-sequence occurs statistically, and merging the same P-Code sub-sequences; and
   retaining the P-Code sub-sequence having a frequency exceeding a threshold value G2, and decoding the P-Code sub-sequence according to the code maps of the tiers to generate the schema of the NoSQL type database.

4. The method according to claim 1, wherein the determination of the record schema includes:
   extracting the keys included in the entries;
   determining hierarchy information of the extracted keys in the entries; and
   determining the treelike relationship between the keys according to the hierarchy information.

5. The method according to claim 1, wherein the generation of the schema of the NoSQL type database includes:
   acquiring an effective path and its weight in the at least one path; and
   generating the schema of the NoSQL type database based on the effective path and its weight.

6. A computer system comprising:
   one or more computer processors;
   a computer readable storage device; and
   computer code stored on the computer readable storage device, with the computer code including instructions for causing the one or more computer processors to perform operations including the following:

determining a record schema of a set of entry(ies) in a NoSQL (Not-only-Structured-Query-Language) type database, the record schema being a treelike relationship between key hierarchies with a key as a node in each entry of the set of entry(ies), wherein the key corresponds to an attribute name;

encoding the record schema of the entry(ies) of the set of entry(ies) with child in parent (CinP) encoding, where a CinP-code of each node includes a parent code (P-Code) of the node itself and a child code (C-Code) of the sub-nodes thereof;

determining a node in which there is an attribute name variation based on a similarity of sub-nodes in CinP-encoded record schema, and updating a corresponding record schema according to the determined result, further including:

parsing the encoded record schema in the tree structure into a path set, the path comprising the codes of all nodes which are traversed from a leaf node to a root node, putting into buckets according to the P-Code of a certain tier, in the buckets, determining a parent node in which there is an attribute name variation according to the similarity of the sub-nodes in the tier, updating a source P-Code of part of the determined parent node in which there is an attribute name variation to a target P-Code, and updating the C-Code code of a parent node corresponding to the updated parent node; and generating a schema for the NoSQL type database based on the updated record schema.

7. The device according to claim 6, wherein the module configured to, in the buckets, determine a parent node in which there is an attribute name variation according to the similarity of the sub-nodes in the tier comprises:

a module configured to determine, for the bucket in which a plurality of paths exist, a node whose parent nodes in the plurality of paths have different P-Code;

a module configured to calculate the similarity of the parent nodes by the C-Code of the parent nodes and an equation $$S(N_1, N_2) = \frac{|C_{N_1} \cap C_{N_2}|}{|C_{N_1} \cup C_{N_2}|},$$

where N1 and N2 represent two parent nodes, $C_{N_1}$ represents a set of sub-nodes of N1, $C_{N_2}$ represents a set of sub-nodes of N2, and the |"set"| notation represents a number of elements in a set; and a module configured to consider that an attribute name variation occurs in the two parent nodes if the similarity is greater than a threshold value G1.

8. The device according to claim 7, wherein the module configured to generate a schema of the NoSQL type database according to the at least one updated record schema comprises:

a module configured to, in the path code, extract a sub-sequence containing only the P-Code, counting a frequency at which the sub-sequence occurs statistically, and merging the same P-Code sub-sequences; and a module configured to retain the P-Code sub-sequence having a frequency exceeding a threshold value G2, and decoding the P-Code sub-sequence according to the code maps of the tiers to generate the schema of the NoSQL type database.

9. The device according to claim 6, wherein the determiner comprises:

a module configured to extract the keys included in the entries;

a module configured to determine hierarchy information of the extracted keys in the entries; and a module configured to determine the treelike relationship between the keys according to the hierarchy information.

10. The device according to claim 6, wherein the generator comprises:

a module configured to acquire an effective path and its weight in the at least one path; and a module configured to generate the schema of the NoSQL type database based on the effective path and its weight.

11. A computer program product comprising a non-transitory computer readable storage medium having stored thereon:

first program instructions programmed to determine a record schema of a set of entry(ies) in a Not-only-Structured-Query-Language (NoSQL) type database, the record schema being a treelike relationship between key hierarchies with a key as a node in each entry of the set of entry(ies), wherein the key corresponds to an attribute name;

second program instructions programmed to encode the record schema of the each entry of the set of entry(ies) with child in parent (CinP) encoding, where a CinP-code of each node includes a parent code (P-Code) of the node itself and a child code (C-Code) of the sub-nodes thereof;

third program instructions programmed to determine a node in which there is an attribute name variation based on a similarity of sub-nodes in the CinP-encoded record schema, and updating a corresponding record schema according to the determined result, further including:

fourth program instructions programmed to parse the encoded record schema in the tree structure into a path set, the path including the codes of all nodes which are traversed from a leaf node to a root node, fifth program instructions programmed to put into buckets according to the P-Code of a certain tier, sixth program instructions programmed to, in the buckets, determine a parent node in which there is an attribute name variation according to the similarity of the sub-nodes in the tier, and seventh program instructions programmed to update a source P-Code of part of the determined parent node in which there is an attribute name variation to a target P-Code, eighth program instructions programmed to update the C-Code code of a parent node corresponding to the updated parent node; and ninth program instructions programmed to generate a schema for the NoSQL type database based on the updated record schema.

12. The product according to claim 11, wherein the second program instructions further include:

tenth program instructions programmed to, for the bucket in which a plurality of paths exist, determine a node whose parent nodes in the plurality of paths have different P-Code;

eleventh program instructions programmed parent nodes and an equation $$S(N_1, N_2) = \frac{|C_{N_1} \cap C_{N_2}|}{|C_{N_1} \cup C_{N_2}|},$$

where $N_1$ and N2 represent two parent nodes, $C_{N1}$ represents a set of sub-nodes of N1, $C_{N2}$ represents a set of sub-nodes of N2, and the |"set"| represents a number of elements in the set; and twelfth program instructions programmed to consider that an attribute name variation occurs in the two parent nodes if the similarity is greater than a threshold value G1.

13. The product according to claim 12, wherein the generation of the third program instructions further include:

thirteenth program instructions programmed to, in the path code, extract a sub-sequence containing only the P-Code, counting a frequency at which the sub-sequence occurs statistically, and merging the same P-Code sub-sequences; and fourteenth program instructions programmed to retain the P-Code sub-sequence having a frequency exceeding a threshold value G2, and decoding the P-Code sub-sequence according to the code maps of the tiers to generate the schema of the NoSQL type database.

14. The product according to claim 11, wherein the first program instructions include:

fifteenth program instructions programmed to extract the keys included in the entries;

sixteenth program instructions programmed to determine hierarchy information of the extracted keys in the entries; and seventeenth program instructions programmed to determine the treelike relationship between the keys according to the hierarchy information.

* * * * *